(12) United States Patent
Luo et al.

(10) Patent No.: US 11,889,559 B2
(45) Date of Patent: Jan. 30, 2024

(54) CHANNEL SENSING WITH SELF-INTERFERENCE AWARENESS FOR UNLICENSED BAND

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Basking Ridge, NJ (US); Naeem Akl, Somerville, NJ (US); Tao Luo, San Diego, CA (US); Luca Blessent, Whitehouse Station, NJ (US); Junyi Li, Franklin Park, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 17/224,014

(22) Filed: Apr. 6, 2021

(65) Prior Publication Data
US 2022/0322442 A1    Oct. 6, 2022

(51) Int. Cl.
*H04W 74/08* (2009.01)
*H04B 17/336* (2015.01)
(Continued)

(52) U.S. Cl.
CPC ...... *H04W 74/0825* (2013.01); *H04B 17/336* (2015.01); *H04W 24/10* (2013.01); *H04W 88/14* (2013.01)

(58) Field of Classification Search
CPC . H04W 74/0825; H04W 24/10; H04W 88/14; H04W 74/0808; H04B 17/336;
(Continued)

(56) References Cited

U.S. PATENT DOCUMENTS

2010/0075611 A1* 3/2010 Budampati ......... H04L 27/0014
455/67.11
2010/0120446 A1* 5/2010 Gaal ................. H04W 72/1231
455/452.2
(Continued)

FOREIGN PATENT DOCUMENTS

WO    2021004142 A1    1/2021

OTHER PUBLICATIONS

Convida Wireless: "Design Considerations on Channel Accessing", Draft, 3GPP TSG-RAN WG1 Meeting #94 Bis, R1-1811625, 3rd Generation Partnership Project (3GPP), Mobile Competence Centre, 650, Route Des Lucioles, F-06921 Sophia-Antipolis Cedex, France, vol. RAN WG1, No. Chengdu, China, Aug. 8, 2018-Aug. 12, 2018, Sep. 29, 2018, XP051519019, 5 Pages, Retrieved from the Internet: URL: http://www.3gpp.org/ftp/tsg%5Fran/WG1%5FRL1/TSGR1%5F94b/Docs/R1%2D1811625%2Ezip [Retrieved on Sep. 29, 2018] section 2.1, 4th and 5th paragraphs, p. 5.
(Continued)

*Primary Examiner* — Tejis Daya
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for channel sensing with self-interference awareness for unlicensed band. A node may transmit, via a first entity of the node, at least one signal during a LBT procedure of a second entity of the node. The at least one signal may include a signal energy. The LBT procedure may be associated with a total measured interference from all detected energy sources. The node may determine a self-interference at the second entity of the node based on the signal energy of the at least one signal transmitted via the first entity of the node and calculate an interference from at least one other source based on a difference between the total measured
(Continued)

interference from all detected energy sources and the self-interference determined based on the signal energy of the at least one signal.

32 Claims, 10 Drawing Sheets

(51) Int. Cl.
*H04W 24/10* (2009.01)
*H04W 88/14* (2009.01)

(58) Field of Classification Search
CPC ....... H04B 7/015; H04B 1/525; H04L 5/0073; H04L 5/1461; H04L 5/001; H04L 5/0048; H04L 5/0051; H04L 5/0055; H04L 27/0006
See application file for complete search history.

(56) References Cited

U.S. PATENT DOCUMENTS

| | | | |
|---|---|---|---|
| 2013/0208711 A1* | 8/2013 | Van Lieshout ... | H04W 72/1215 370/336 |
| 2017/0332395 A1* | 11/2017 | Yin ........................ | H04W 72/23 |
| 2018/0324860 A1* | 11/2018 | Mattsson ............. | H04B 17/318 |
| 2019/0174545 A1* | 6/2019 | Li ........................ | H04W 52/143 |
| 2019/0246425 A1* | 8/2019 | Zhang ............... | H04W 74/0833 |
| 2020/0037359 A1* | 1/2020 | Wang .................... | H04L 1/1812 |
| 2022/0338254 A1* | 10/2022 | Abotabl ................ | H04W 76/14 |
| 2022/0346044 A1* | 10/2022 | Dahlman ............ | H04W 56/001 |

OTHER PUBLICATIONS

International Search Report and Written Opinion—PCT/US2022/023072—ISA/EPO—dated Jul. 4, 2022.

* cited by examiner

CHANNEL SENSING WITH SELF-INTERFERENCE AWARENESS FOR UNLICENSED BAND

BACKGROUND

Technical Field

The present disclosure relates generally to communication systems, and more particularly, to channel sensing techniques based on self-interference awareness for an unlicensed band.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may transmit, via a first entity of the node, at least one signal during a listen before talk (LBT) procedure of a second entity of the node, the at least one signal including a signal energy, the LBT procedure associated with a total measured interference from all detected energy sources; determine a self-interference at the second entity of the node based on the signal energy of the at least one signal transmitted via the first entity of the node; and calculate an interference from at least one other source based on a difference between the total measured interference from all detected energy sources and the self-interference determined based on the signal energy of the at least one signal.

In another aspect of the disclosure, a method, a computer-readable medium, and an apparatus are provided. The apparatus may receive, from a second node, at least one signal during a LBT procedure of the first node, the at least one signal including a signal energy, the LBT procedure associated with a total measured interference from all detected energy sources; determine an interference at the first node based on the signal energy of the at least one signal transmitted from the second node; and calculate additional interference from at least one other source based on a difference between the total measured interference from all detected energy sources and the interference determined based on the signal energy of the at least one signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
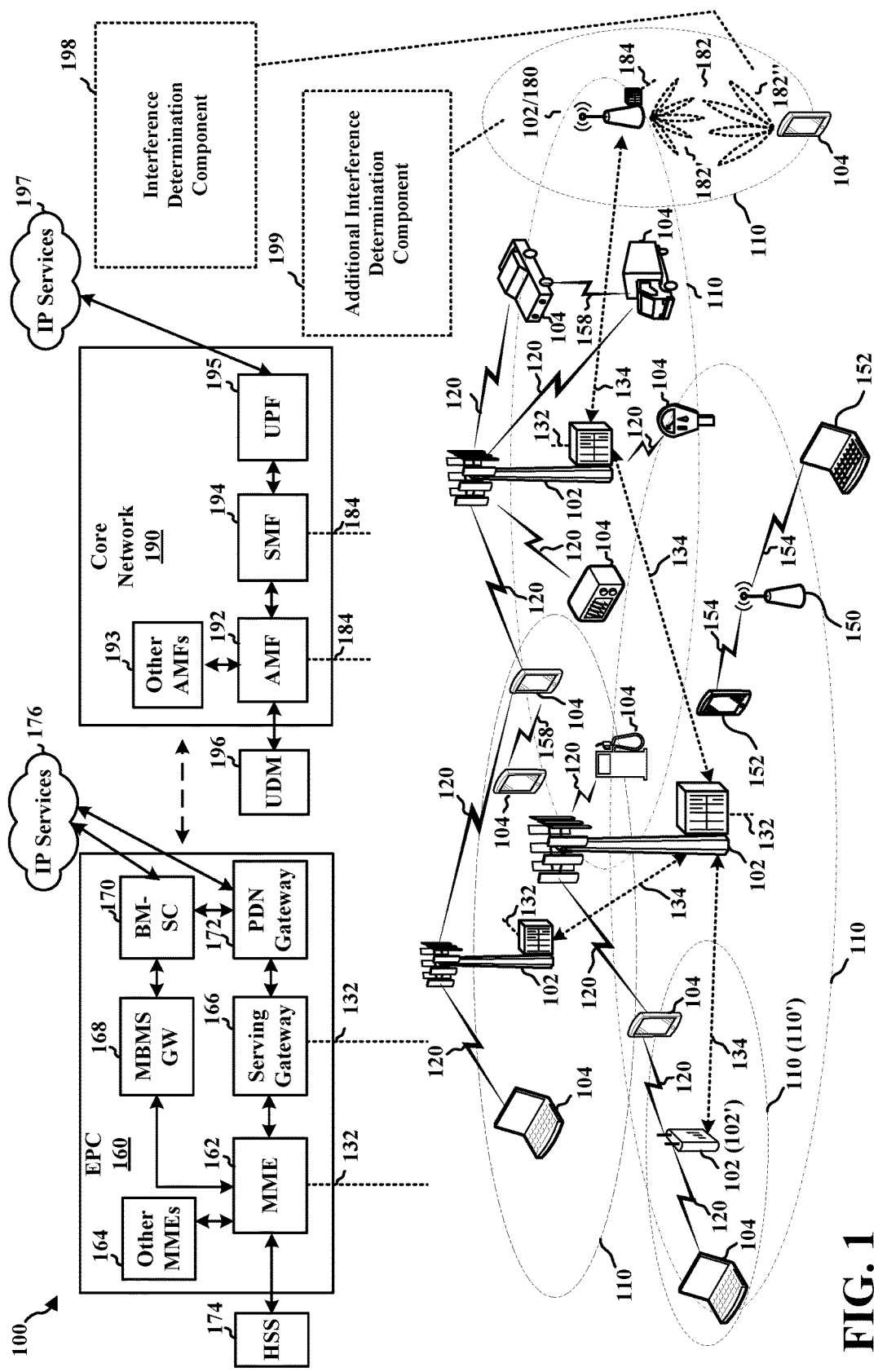
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an interference determination component 198 configured to transmit, via a first entity of the node, at least one signal during a listen before talk (LBT) procedure of a second entity of the node, the at least one signal including a signal energy, the LBT procedure associated with a total measured interference from all detected energy sources; determine a self-interference at the second entity of the node based on the signal energy of the at least one signal transmitted via the first entity of the node; and calculate an interference from at least one other source based on a difference between the total measured interference from all detected energy sources and the self-interference determined based on the signal energy of the at least one signal. In certain aspects, the base station 180 may include an additional interference determination component 199 configured to receive, from a second node, at least one signal during a LBT procedure of the first node, the at least one signal including a signal energy, the LBT procedure associated with a total measured interference from all detected energy sources; determine an interference at the first node based on the signal energy of the at least one signal transmitted from the second node; and calculate additional interference from at least one other source based on a difference between the total measured interference from all detected energy sources and the interference determined based on the signal energy of the at least one signal. Although the following description may be focused on 5G NR, the concepts described herein may be applicable to other similar areas, such as LTE, LTE-A, CDMA, GSM, and other wireless technologies.

Figure 2:
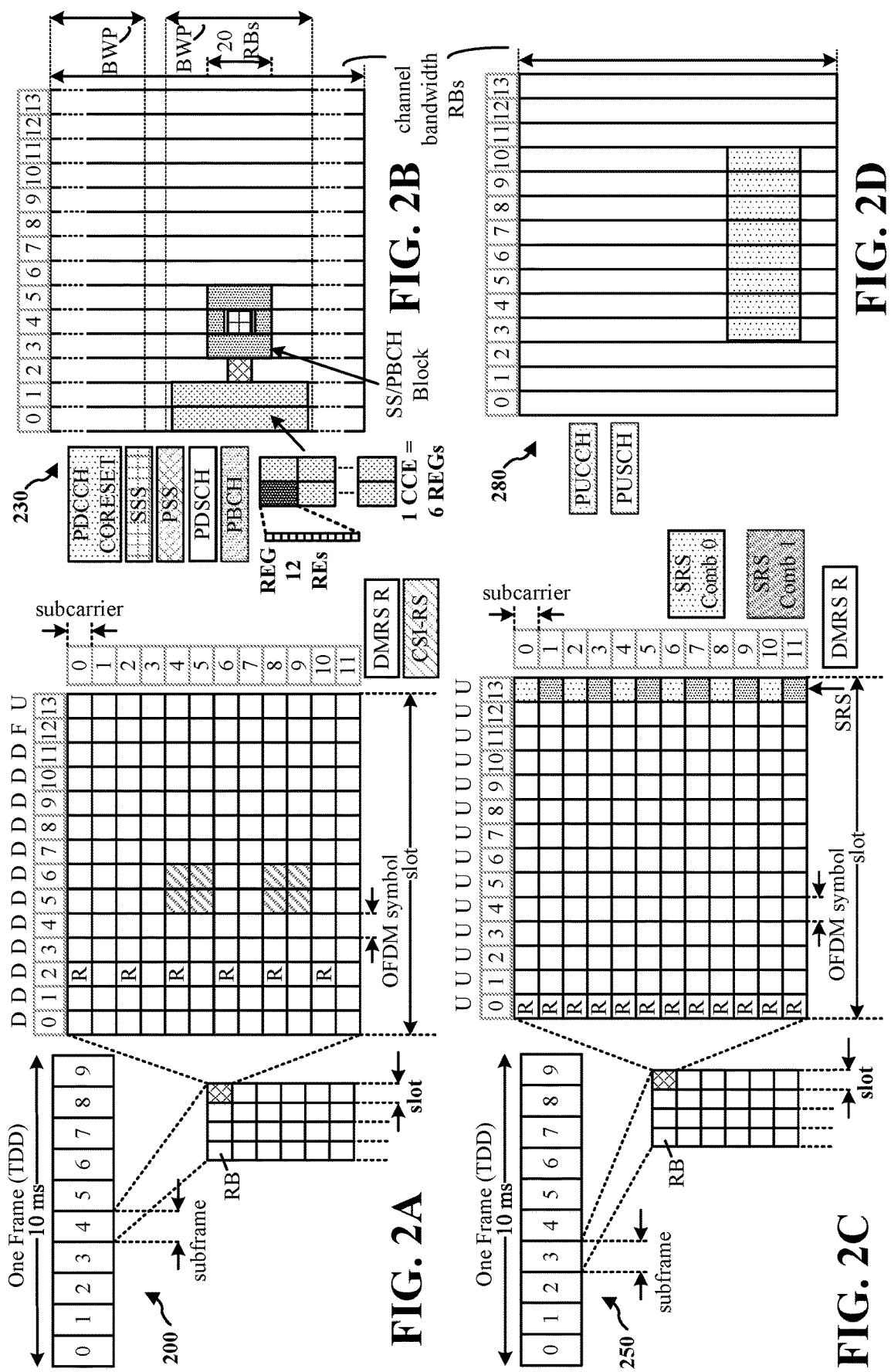
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
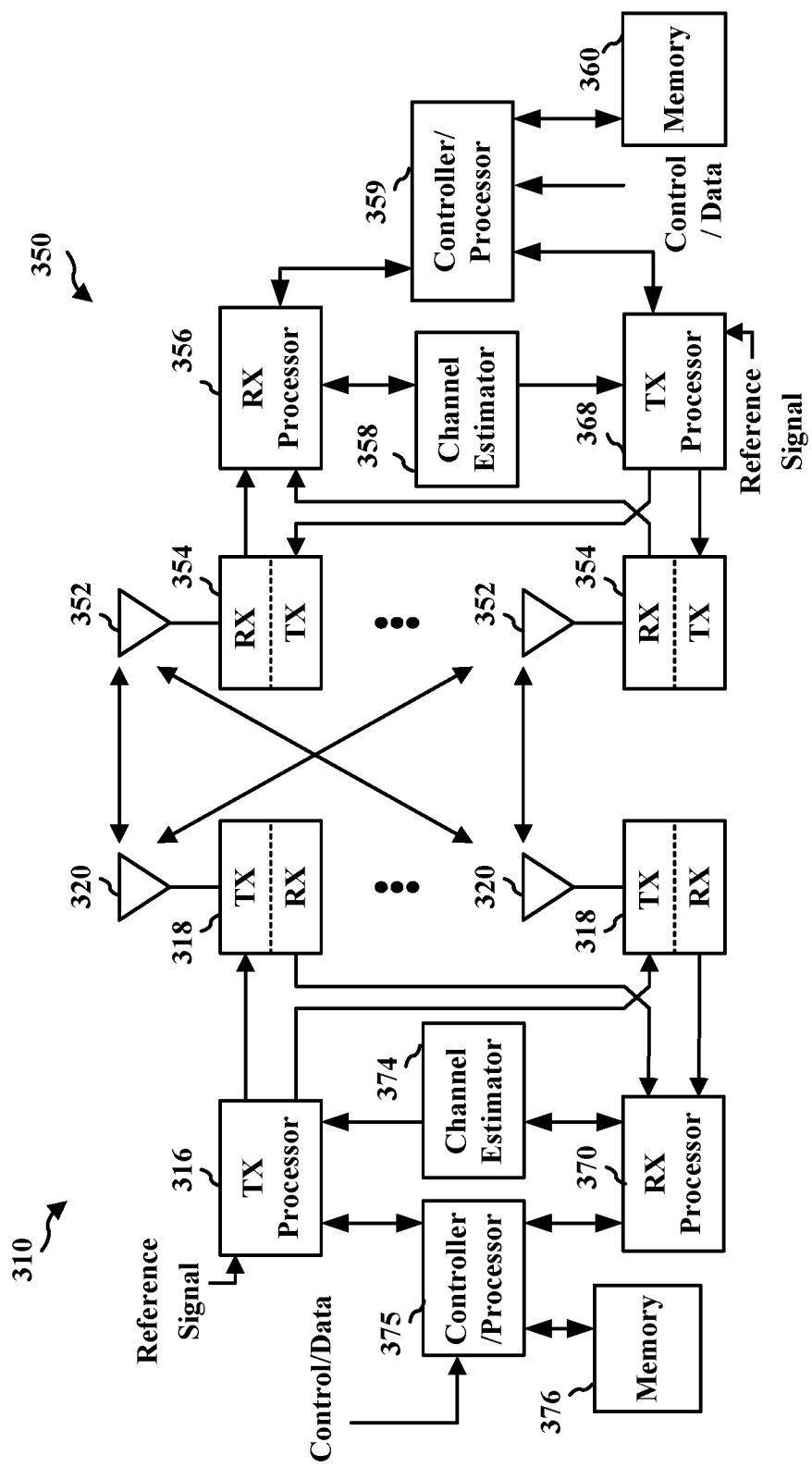
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the interference determination component 198 of FIG. 1.

At least one of the TX processor 316, the RX processor 370, and the controller/processor 375 may be configured to perform aspects in connection with the additional interference determination component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
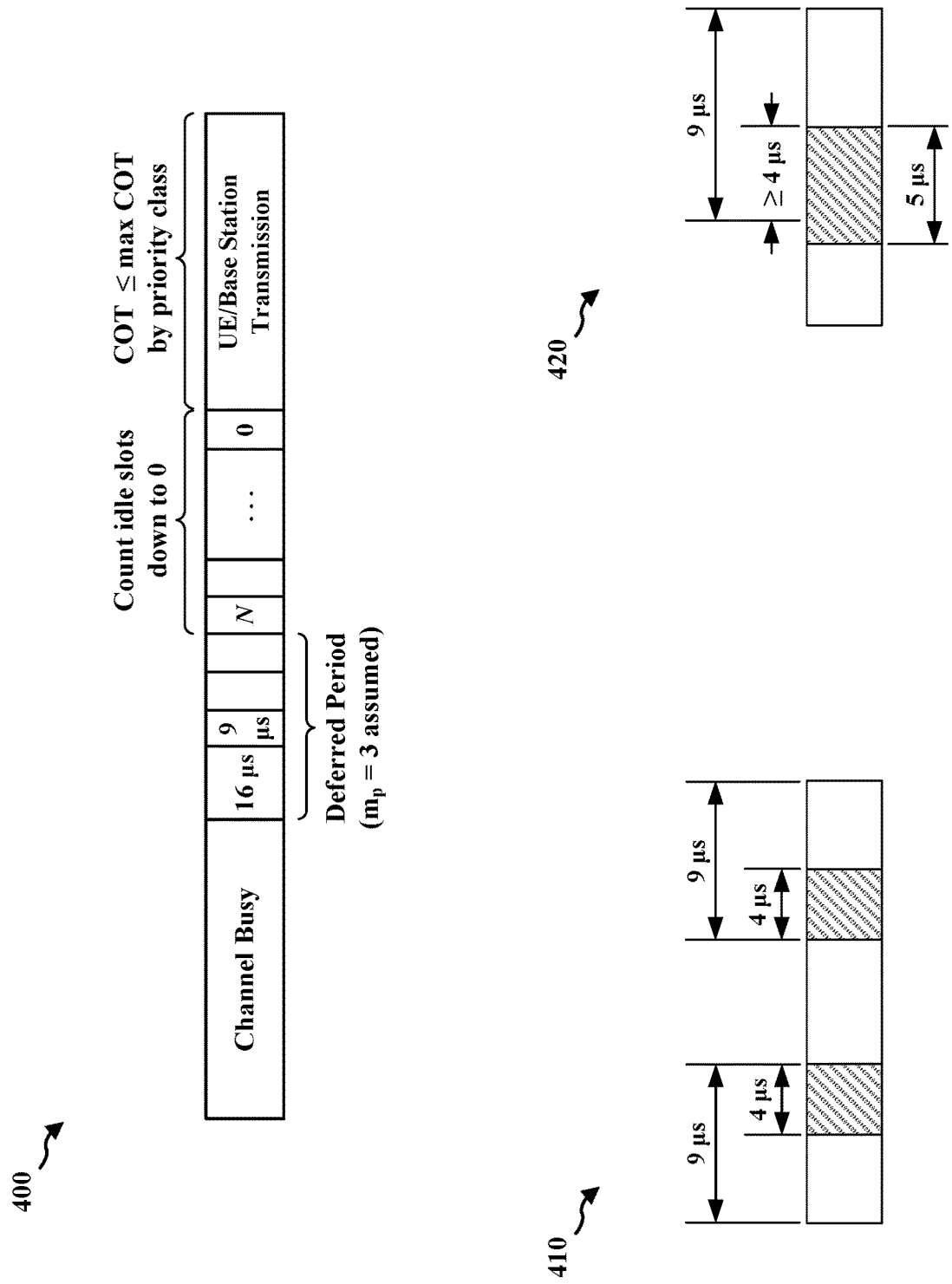
FIG. 4 illustrates diagrams of channel sensing techniques.

FIG. 4 illustrates diagrams 400-420 of channel sensing techniques. A node, such as a UE, a base station, an integrated access and backhaul (IAB) node, etc., may transmit a signal in an NR unlicensed spectrum (NR-U) if, based on channel sensing procedures, a channel is determined to include less than a threshold amount of interference. Channel sensing may be performed over a sensing slot, which may be 9 μs in duration. The sensing slot may be determined to be idle if a detected power for at least 4 μs within the sensing slot is less than an energy detection threshold. Otherwise, the sensing slot may be determined to be busy/non-idle. The energy detection threshold may be based on a transmission power bandwidth, or based on a configuration by the base station.

Different types of channel access procedures may be utilized for NR-U. For example, as illustrated in the diagram 400, channel access procedure Type 1 may be a contention window-based channel sensing procedure based on a random number of sensing slots. A consecutive number of slots (e.g., random number of consecutive slots) associated with a traffic class of traffic to be transmitted by the node may have to be determined as idle slots before the traffic may be transmitted. The number of consecutive slots may be 2-3 slots for traffic associated with a decreased transmission time. That is, a random number may be generated from 2-3 indicative of a number of idle slots that is to occur before the node may transmit.

A channel busy duration may be followed by a deferred/idle duration that is based on the traffic type. A counter for the idle slots may be initiated based on an initial random value an incremented down to 0 based on each passing slot. The counter may be stopped if the channel is determined to be busy. After the deferred/idle duration has elapsed with each slot of the duration being idle, the counter may be restarted such that the node may transmit once the counter reaches 0. Thus, the length of time associated with the deferred/idle duration may vary based on the random number generated for the slots.

Channel access procedures Type 2A (e.g., illustrated in the diagram 410), Type 2B (e.g., illustrated in the diagram 420), and Type 2C may be based on sensing procedures that include a fixed sensing time (e.g., 25 μs or 16 μs). For Type 2A, the sensing time may be 25 µs and may correspond to 2 sensing slots that comply with the energy detection threshold. For Type 2B, the sensing time may be 16 µs and may correspond to 1 sensing slot that complies with the energy detection threshold. Channel sensing may be performed over a 5 µs duration within the 16 µs sensing slot, where at least 4 µs of the channel sensing may be within a 9 µs duration of the sensing slot. For Type 2C, channel sensing may not be performed, but a gap between transmissions may be less than or equal to 16 µs. If the energy detection threshold is determined to be exceeded based on the fixed sensing time of Types 2A-2C, the node may not transmit. If the energy detection threshold is determined not to be exceeded based on the fixed sensing time of Types 2A-2C, the node may transmit.

The energy detection threshold may be utilized for determining channel idleness during a channel access procedure. A maximum value for a number of slots may be determined by the base station based on a predefined protocol indicative of one or more of a function of a maximum Tx power, a bandwidth, other aspects of sharing the channel, etc. The maximum value for the number of slots may be configured to the UE via an absolute value (e.g., maxEnergyDetection-Threshold) or an offset value (e.g., energyDetectionThresholdOffset), or determined by the UE based on the predefined protocol.

If a channel is acquired by the base station, a channel occupancy time (COT) may be shared with the UE. If the channel is acquired by the UE, the COT may be shared with the base station. When the COT is shared with other nodes, channel access procedure Type 2 may be applied to sense the channel based on a pass/fail determination of the energy detection threshold over the fixed sensing time. If the Type 2 procedures fails, the Type 1 procedure may be subsequently attempted. A COT sharing determination by the UE may be based on parameters, such as ULtoDL-CO-SharingED-Threshold-r16, associated with a COT sharing threshold (e.g., maximum energy threshold) for allowing a UE-initiated COT to be shared with the base station. In examples, the parameters for the COT sharing determination may be configured by the base station based on the Tx power of the base station.

Figure 5:
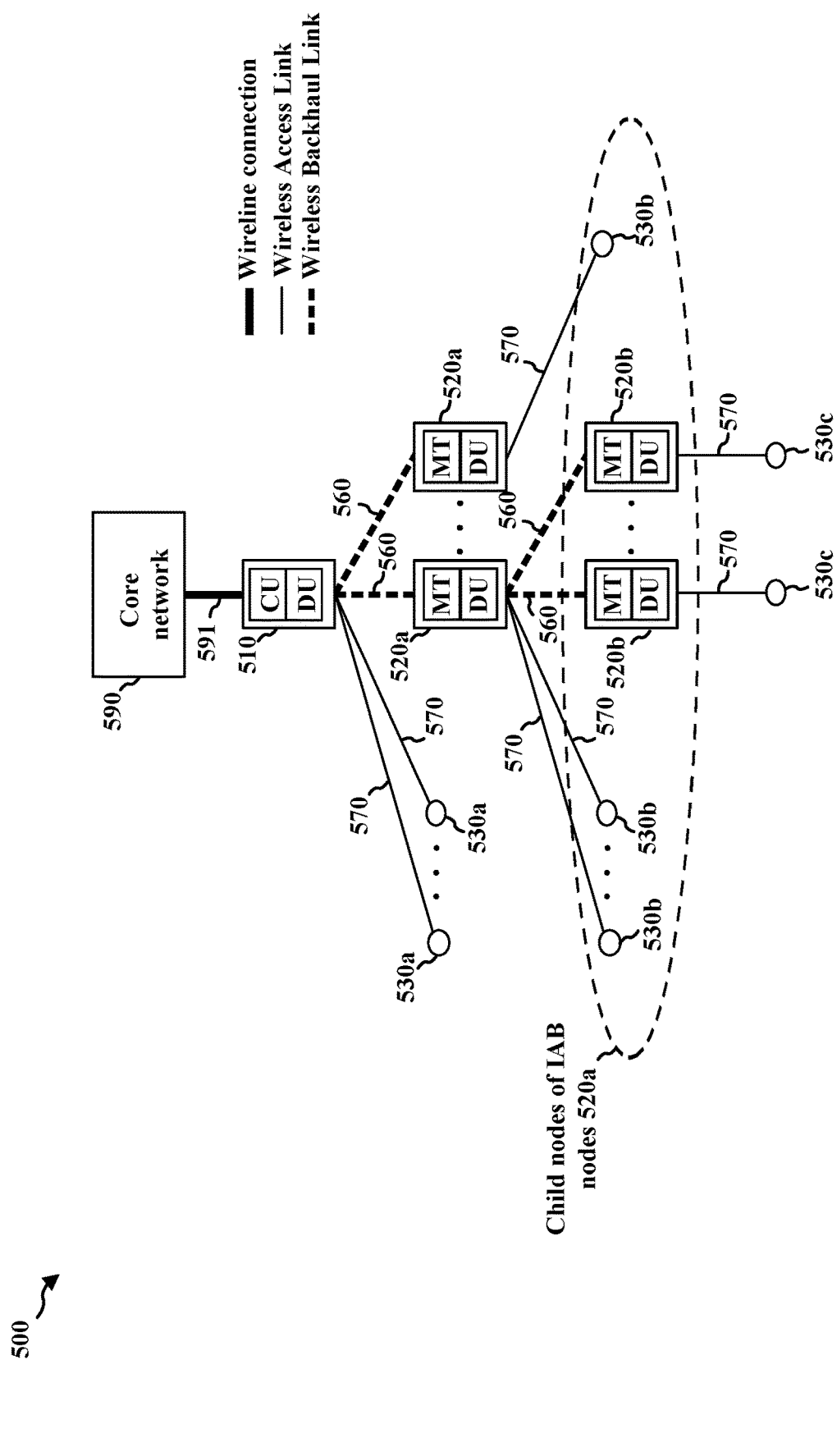
FIG. 5 is a diagram illustrating an integrated access and backhaul (IAB) network and components thereof.

FIG. 5 is a diagram illustrating an IAB network 500 and components thereof. The IAB network 500 includes an IAB donor 510 and IAB nodes 520. The IAB nodes, as well as the IAB donor, may provide wireless access links to UEs 530.

The IAB donor 510 may be considered a root node of the tree structure of the IAB network 500. The IAB donor node 510 may be connected to the core network 590 via a wired connection 591. The wired connection may include, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may control the IAB network 500 through configuration. The CU may perform RRC/PDCP layer functions. The IAB donors 510 further include a DU that performs scheduling. For example, the DU may schedule resources for communication by the child IAB nodes 520a and/or UEs 530a of the IAB donor 510. The DU holds radio link control (RLC), media access control (MAC), a physical (PHY) layer functions.

The IAB nodes 520a, 520b may include a mobile termination (MT) and a DU. The IAB node is an L2 relay node. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node including a DU that schedules a child IAB node/child UE may continue to more connections that illustrated in FIG. 5.

Figure 6:
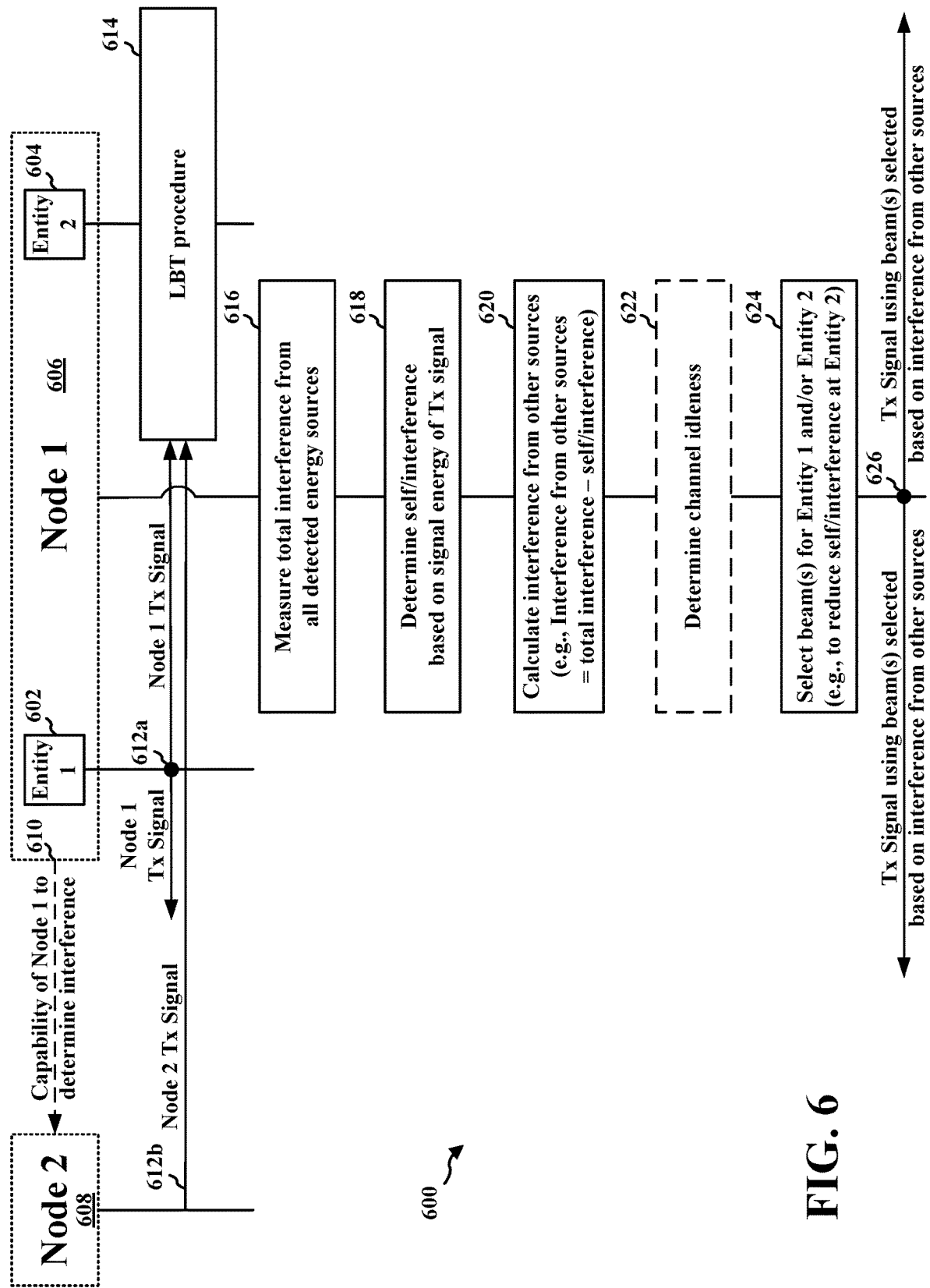
FIG. 6 is a call flow diagram illustrating communications between nodes and entities of a node.

FIG. 6 is a call flow diagram 600 illustrating communications between nodes and entities of a node. A first node 606 may include a first entity 602 and a second entity 604. The first entity 602 may be a transmitting entity and the second entity 604 may be a receiving entity. In aspects, the first node 606 may signal, at 610, a capability to a second node 608 that indicates the first node 606 is capable of determining interference at the first node 606 (e.g., interference at the second entity 604 of the first node 606).

In a first example, the first entity 602 of the first node 606 may transmit, at 612a, one or more Node 1 Tx signals during an LBT procedure performed, at 614, by the second entity 604 of the first node 606. In a second example, the second entity 604 of the first node 606 may receive, at 612b, a Node 2 Tx signal from the second node 608 during the LBT procedure performed, at 614, by the first node 606 (e.g., the LBT procedure performed, at 614, by the second entity 604).

At 616, the first node 606 may measure a total interference from all detected energy sources, e.g., all energy sources detected via the LBT procedure performed, at 614. In the first example, the first node 606 may determine, at 618, self-interference from the first entity 602 of the first node 606 to the second entity 604 of the first node 606. In the second example, the first node 606 may determine interference from the second node 608 to the first node 606. At 620, the first node 606 may calculate interference from other sources. For instance, in the first example, the interference from the other sources may equal the total interference measured, at 616, minus the self-interference from the first entity 602 determined, at 618. In the second example, the interference from the other sources may equal the total interference measured, at 616, minus the interference from the second node 608 determined, at 618.

At 622, the first node 606 may determine channel idleness. That is, if the interference from the other sources is below a predefined threshold, the channel may be determined to be idle. If the interference from the other sources is at or above the predefined threshold, the channel may be determined to be busy/non-idle. At 624, the first node 606 may select beam(s) for the first entity 602 of the first node 606 and/or the second entity 604 of the first node 606 that may reduce the interference/self-interference at the second entity 604 of the first node 606. At 626, the first node 606 may transmit one or more Tx signals using the beam(s) selected, at 624, based on the determined interference from the other sources.

A node that includes multiples entities (e.g., an IAB node having a MT and a DU, or a UE/base station having multiple TRPs or multiple panels) may perform independent channel sensing and communications with other nodes at each of the multiple entities. For instance, the node may be a UE/base station, where the multiple entities may be associated with different spatial beam directions. The node may also be an IAB node, where the multiple entities may perform the MT function and the DU function of the IAB node. When a first entity is transmitting while a second entity is performing an LBT procedure, inter-entity self-interference may occur at the second entity of the node. For example, the MT may cause self-interference to the DU, or multi-TRP/multi-panels may cause self-interference from Tx to Rx.

Channel sensing in NR-U may be performed to detect whether interference is received from other nodes, such as other nodes that may not coordinate with the current node. If so, the current node may delay/refrain from transmitting until the interference from the other nodes decreases and the channel is determined to be idle. While some transmission techniques may include leaving transmissions gaps in an on-going transmission for channel sensing to be performed, the detected interference, in some cases, may be caused by the other nodes that may not coordinate with the current node. Thus, performing channel sensing during the on-going transmission of the first entity without having to leave gaps in the on-going transmission may be advantageous, e.g., when the scheduling node for the on-going transmission is located at another node, as the other node may not be configured to accurately determine locations of the transmission gaps for sensing the channel at the second entity. For example, an IAB node may have an on-going transmission from an MT entity of the IAB node that is scheduled by a parent node of the IAB node, where the parent node may not determine activity at the DU entity of the IAB node.

An energy associated with interference from other sources may be determined based on subtracting a self-interference energy measurement from a total interference energy measurement determined from channel sensing. In aspects, $\vec{y}=h\cdot\vec{S}+\vec{I}$ may be indicative of a received signal vector at the second entity (e.g., channel sensor), where $\vec{y}$ corresponds to the received signal vector, $\vec{S}$ corresponds to a transmitted self-interference signal from the first entity (e.g., transmitter), h corresponds to an inter-entity channel between the first entity and the second entity, and $\vec{I}$ corresponds to interference/noise from other sources. The inter-entity channel h may be assumed to be a scaler associated with an end-to-end channel including Tx beamforming and Rx beamforming for a single-layer transmission over one LBT channel, which may have a bandwidth of 20 MHz. The inter-entity channel h may also correspond to a vector such that separate layers of a multi-layer transmission may be modeled based on $\vec{y}=h\cdot\vec{S}+\vec{I}$ to extend an applicability of such techniques beyond single layer transmissions.

Based on the transmitted self-interference signal $\vec{S}$ being independent of the interference/noise from other sources $\vec{I}$, the total interference energy may include both the self-interference energy and other interference energy from other sources. For slow-varying channels, the total interference energy may be determined within the sensing slot based on $E[\vec{y}^H\vec{y}]=|h|^2\cdot E[\vec{S}^H\vec{S}]+E[\vec{I}^H\vec{I}]$. Based on the self-interference signal $\vec{S}$ being transmitted by a co-located entity at the node, the transmitted self-interference may be determined by the node in advance for measuring the inter-entity channel h.

In some cases, the other interference may be determined in a shortened amount of time after a measurement window of the sensing slot. For example, a sensing slot may be 9 µs for frequency range 1 (FR1), but may be 5 µs for a higher frequency band. A channel idleness determination may have to occur within the duration of the sensing slot. Thus, the inter-entity channel h may be measured before the sensing slot and within a channel coherence time. The energy of transmitted self-interference signal $E[\vec{S}^H\vec{S}]$ may be measured during transmission of the self-interference signal $\vec{S}$ (e.g., during the transmission window), or the self-interference signal $\vec{S}$ may be determined by the node prior to over-the-air transmission of the self-interference signal $\vec{S}$. Hence, $E[\vec{S}^H\vec{S}]$ may be determined before the sensing slot. To reduce implementation complexities, a location of the sensing slot may be selected to align with a reference signal (e.g., SSB, CSI-RS, demodulation reference signal (DMRS), SRS, etc.), where a configuration of the reference signal may be determined by the node.

Measurement of the inter-entity channel h may depend on a beam pair used by the Tx entity and the sensing entity, and may vary based on environmental changes, such as surrounding reflectors. Changes to the channel conditions may be slow for a fixed IAB network or a base station communicating with one or more slow moving UEs, such that measurement of the inter-entity channel h may be performed in advance. In examples, a generated table of channel measurement values of different TX and sensing beam pairs may be updated based on the channel coherence time. For the received signal vector $\vec{y}_1=h\cdot\vec{S}_1+\vec{I}_1$, where $\vec{S}_1$ is determined in advance by the node, the inter-entity channel h may be estimated using one or more predefined algorithms. For example, an algorithm may define a correlation between $\vec{y}_1$ and the transmitted self-interference signal $\vec{S}_1$. Based on the assumption that $E[\vec{S}_1^H\vec{I}_1]=0$, then $$h = \frac{E[\vec{S}_1^H \vec{y}_1]}{E[\vec{S}_1^H \vec{S}_1]}.$$

For higher bands associated with an antenna array, the inter-entity channel may be determined based on $h=\vec{W}_s^H C \vec{W}_{tx}$, where $\vec{W}_s$ corresponds to a beam weight used by the sensing entity (e.g., received vector), $\vec{W}_{tx}$ corresponds to the beam weight used by the Tx entity (e.g., transmitter vector), C corresponds to a channel matrix between the transmitter and sensing antenna elements. In some cases, the Tx and sensing beam pair may be selected such that a power of the inter-entity channel h is decreased significantly below a detection threshold, or even assumed to be $|h|\approx 0$, to approximate the other interference energy by equating the other interference energy to the total interference energy. For example, the node may be an IAB node having an MT that communicates with a parent node based on $\vec{W}_{tx}$. The DU of the IAB node may serve one or more child nodes (e.g., access UEs or other IAB nodes) and, for some child nodes, the antenna weight $\vec{W}_s$ (e.g., sensing weight) may be at a NULL space of $C\vec{W}_{tx}$. In such cases, while the MT of the IAB node may transmit toward a direction of the parent node based on $\vec{W}_{tx}$, the IAB node may prioritize channel sensing toward the direction(s) of the child nodes that may be in the NULL space of $C\vec{W}_{tx}$.

In a first aspect, channel sensing may be performed by the sensing entity during an on-going transmission of the Tx entity (e.g., without leaving transmission gaps in the on-going transmission) based on interference/self-interference awareness techniques for channel sensing. For example, sensing a slot to determine channel idleness may be based on a calculation of the other interference energy, which can be determined by subtracting the self-interference energy from the total interference energy measured within the sensing slot. The self-interference energy may be determined based on a measurement of the inter-entity channel and an energy of the transmitted signal from the Tx entity. The inter-entity channel may be measured at any time before channel sensing, but within a channel coherence time, based on the determination of the transmitted signal from the Tx entity. The energy of transmitted signal from the Tx entity may be measured during the sensing slot while the Tx entity is transmitting, or determined before the sensing slot based on a predetermined indication of the transmitted signal. In some cases, the sensing slot may occur at any time during the transmission by the Tx entity. In further cases, the sensing slot may be limited to being aligned with predefined time associated with the transmission by the Tx entity, such as a time associated with one or more reference signals (e.g., SSB, CSI-RS, SRS, DMRS, etc.).

In a second aspect, channel sensing may be performed by the sensing entity during an on-going transmission of the Tx entity (e.g., without leaving transmission gaps in the on-going transmission) based on the node selecting a beam pattern for the Tx entity and/or a beam pattern for the sensing entity. Based on the selection, the self-interference caused by the transmission from the Tx entity to the sensing entity may be far below a detection threshold. The other interference energy may then be approximated based on equating the other interference energy to the total energy without leaving transmission gaps in the transmission of the Tx entity.

Energy detection techniques based on interference/self-interference awareness may be performed via predefined protocols. For example, instead of the total received power being compared to the energy detection threshold for channel sensing, an energy metric for channel sensing may be utilized that accounts for the self-interference from other co-located entities of the node. The energy metric may correspond to the total interference energy less the self-interference energy.

Signaling messages may be communicated between nodes for performing the channel sensing procedure. For example, a capability of the node to perform channel sensing based on self-interference awareness may be signaled/reported to the network/other nodes. Based on the signaled capability, the network may enable or disable the node to perform the channel sensing based on the self-interference awareness techniques. If the node is enabled with the capability, a transmission gap may not be used for channel sensing at the sensing entity while other entities of the node are transmitting. The node may perform channel sensing techniques based on self-interference awareness when there are no transmission gaps in the sensing slot, and perform channel sensing techniques independent of self-interference awareness when there is at least one transmission gap in the sensing slot. If the node is disabled for the capability, a transmission gap may be utilized for channel sensing. A separate energy detection threshold may be configured for channel sensing techniques that are based on the self-interference awareness.

Self-interference awareness techniques may be extended to cases where the interference is received from another node (e.g., another node that is in direct communication with the current node). An on-going transmission of an IAB node may be communicated from a parent node DU to a child node DU while the child node DU is performing channel sensing. Multi-entity nodes may also include UEs and base stations associated with a first entities for transmitting signals and a second entity for sensing/receiving signals. An opposite node to the node that includes the sensing entity may cause interference at the sensing node. In such cases, the on-going transmission at the opposite node may be detected by the sensing entity, such that the interference is caused by a directly communicating node with the current node.

Accordingly, a channel estimation may correspond to the interference channel between the Tx node and the entity of the node that performs the channel sensing, which may use the decoded signal at the Rx entity. The interference channel may be semi-static (e.g., slow varying), such that the channel estimation may be performed at any time within the channel coherent time before channel sensing occurs. A duration of the sensing slot may be decreased (e.g., 9 μs for FR1 or 5 μs for a higher frequency band) for energy detection based on interference awareness during the sensing slot, as there may be less time for decoding the signal corresponding to the measurement window within the sensing slot. The sensing slot may be selected to align with one or more reference signals (e.g., SSB, CSI-RS, SRS, DMRS, etc.) transmitted from the opposite node in direct communication with the current node.

Figure 7:
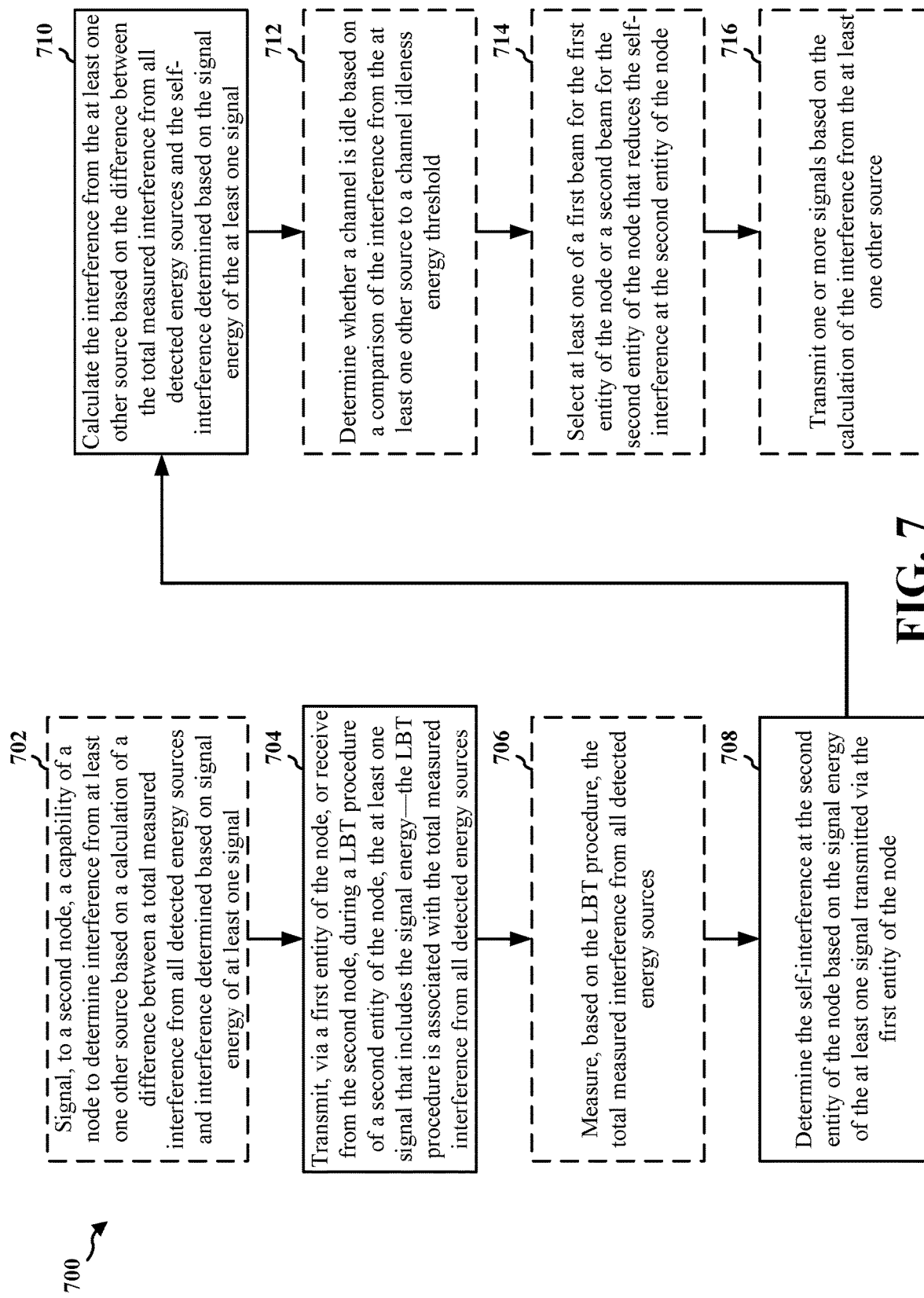
FIG. 7 is a flowchart of a method of wireless communication at a node.

FIG. 7 is a flowchart 700 of a method of wireless communication. The method may be performed by a node (e.g., the UE 104, the base station, 102/180, the IAB node 520a-520b, the IAB donor node 510, the first node 602; the apparatus 902, the apparatus 1002; etc.), which may include the memory 360 and which may be the entire UE 104, base station, 102/180, IAB node 520a-520b, IAB donor node 510, first node 602, or a component of the UE 104, base station, 102/180, IAB node 520a-520b, IAB donor node 510, first node 602, such as the TX processor 368, the RX processor 356, and/or the controller/processor 359.

At 702, the node may signal, to a second node, a capability of the node to determine interference from at least one other source based on a calculation of a difference between a total measured interference from all detected energy sources and interference determined based on signal energy of at least one signal. For example, referring to FIG. 6, the first node 606 may signal, at 610, to the second node 608 a capability of the first node 606 to determine interference. The first node 606 may be an IAB node, a UE, a base station, etc. The capability of the first node 606 signaled, at 610, may be configured to be enabled or disabled. An energy detection threshold may be configured based on the capability of the first node 606 signaled, at 610, to determine the interference from the at least one other source based on the calculation of the difference between the total measured interference from all detected energy sources and the interference/self-interference determined based on the signal energy of the at least one signal.

At 704, the node may transmit, via a first entity of the node, or receive from the second node, during a LBT procedure of a second entity of the node, the at least one signal that includes the signal energy–the LBT procedure is associated with the total measured interference from all detected energy sources. For example, referring to FIG. 6, the first entity 602 of the first node 606 may transmit, at 612a, a signal during the LBT procedure performed, at 614, by the second entity 604 of the first node 606. Alternatively, the second entity 604 of the first node 606 may receive, at 612b, a signal from the second node 608 during the LBT procedure performed, at 614, by the second entity 604 of the first node 606.

At 706, the node may measure, based on the LBT procedure, the total measured interference from all detected energy sources. For example, referring to FIG. 6, the first node 606 may measure, at 616, the total interference from all detected energy sources.

At 708, the node may determine the self-interference at the second entity of the node based on the signal energy of the at least one signal transmitted via the first entity of the node. For example, referring to FIG. 6, the first node 606 may determine, at 618, the self-interference at the second entity 604 of the first node 606 based on the signal transmitted, at 612a, from the first entity 602 of the first node 606. In further aspects, the first node 606 may determine, at 618, the interference at the second entity 604 of the first node 606 based on the signal received, at 612b, from the second node 608. The self-interference at the second entity 604 of the first node 606 may be further determined based on a channel measurement between the first entity 602 of the first node 606 and the second entity 604 of the first node 606. The channel measurement may be performed prior to the LBT procedure performed, at 614, based on a predetermined signal. The self-interference at the second entity 604 of the first node 606 may be determined, in some aspects, prior to transmission, at 612a, of the at least one signal based on an indication of the at least one signal (e.g., from the first entity 602 to the second entity 604). In other aspects, the self-interference at the second entity 604 of the first node 606 may be determined during transmission, at 612a, of the at least one signal. The at least one signal transmitted, at 612a, may be a reference signal including at least one of a SSB, a CSI-RS, a SRS, or a DMRS.

At 710, the node may calculate the interference from the at least one other source based on the difference between the total measured interference from all detected energy sources and the self-interference determined based on the signal energy of the at least one signal. For example, referring to FIG. 6, the first node 606 may calculate, at 620, interference from other sources, e.g., where the interference from the other sources=the total interference–the interference/self-interference. In some aspects, the calculation, at 620, of the interference from the at least one other source may be further based on equating the interference from the at least one other source to the total measured interference from all detected energy sources (e.g., the interference from the other sources=the total interference)

At 712, the node may determine whether a channel is idle based on a comparison of the interference from the at least one other source to a channel idleness energy threshold. For example, referring to FIG. 6, the first node 606 may determine, at 622, a channel idleness based on the calculation, at 620, of the interference from the other sources.

At 714, the node may select at least one of a first beam for the first entity of the node or a second beam for the second entity of the node that reduces the self-interference at the second entity of the node. For example, referring to FIG. 6, the first node 606 may select, at 624, beam(s) for the first entity 602 of the first node 606 and/or the second entity 604 of the first node 606, e.g., to reduce the interference/self-interference at the second entity 604 of the first node 606.

At 716, the node may transmit one or more signals based on the calculation of the interference from the at least one other source. For example, referring to FIG. 6, the first node 606 may transmit a signal, at 626, using the beam(s) selected, at 624, based on the determined interference from the other sources.

Figure 8:
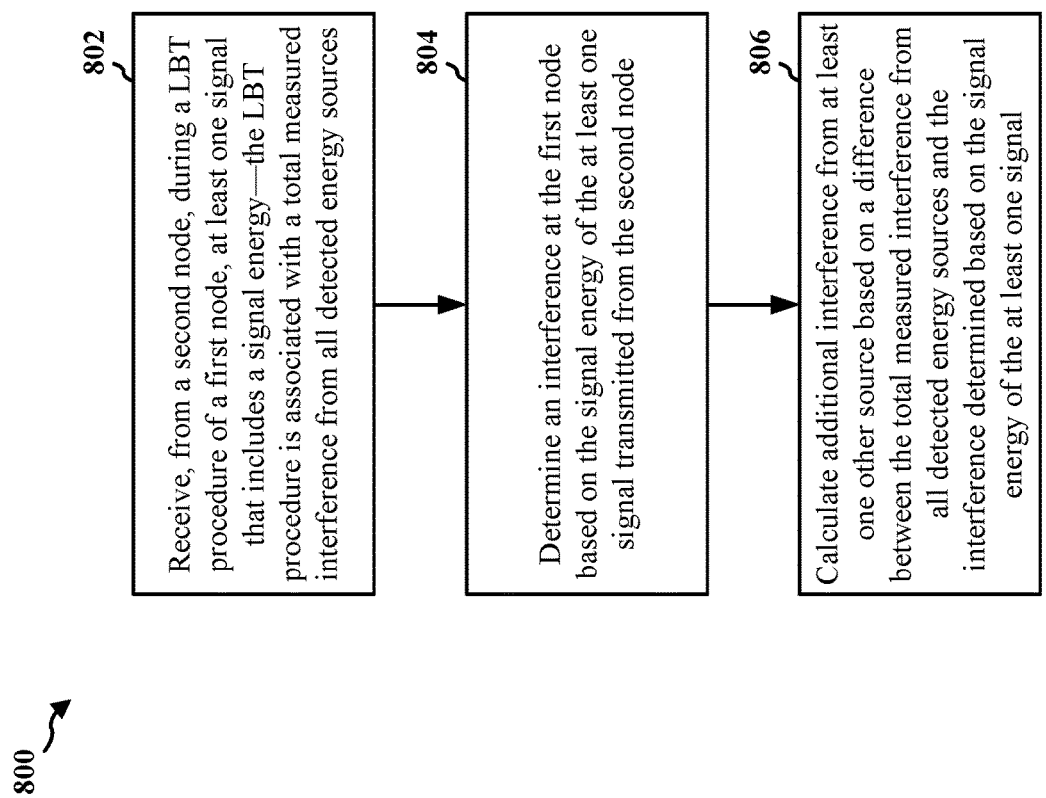
FIG. 8 is a flowchart of a method of wireless communication at a first node.

FIG. 8 is a flowchart 800 of a method of wireless communication. The method may be performed by a first node (e.g., the UE 104, the base station, 102/180, the IAB node 520a-520b, the IAB donor node 510, the first node 602; the apparatus 902, the apparatus 1002; etc.), which may include the memory 376 and which may be the entire UE 104, base station, 102/180, IAB node 520a-520b, IAB donor node 510, first node 602, or a component of the UE 104, base station, 102/180, IAB node 520a-520b, IAB donor node 510, first node 602, such as the TX processor 316, the RX processor 370, and/or the controller/processor 375.

At 802, the first node may receive, from a second node, during a LBT procedure of a first node, at least one signal that includes a signal energy–the LBT procedure is associated with a total measured interference from all detected energy sources. For example, referring to FIG. 6, the second entity 604 of the first node 606 may receive, at 612b, a signal transmitted from the second node 608 during the LBT procedure performed, at 614, by the second entity 604 of the first node 606.

At 804, the first node may determine an interference at the first node based on the signal energy of the at least one signal transmitted from the second node. For example, referring to FIG. 6, the first node 606 may determine, at 618, interference at the second entity 604 of the first node 606 based on the signal energy of the signal received, at 612b, from the second node 608.

At 806, the first node may calculate additional interference from at least one other source based on a difference between the total measured interference from all detected energy sources and the interference determined based on the signal energy of the at least one signal. For example, referring to FIG. 6, the first node 606 may calculate, at 620, interference from other sources (e.g., other sources than the second node 608/first node 606), where the interference from the other sources=the total measured interference–the interference from the second node 608/first node 606.

Figure 9:
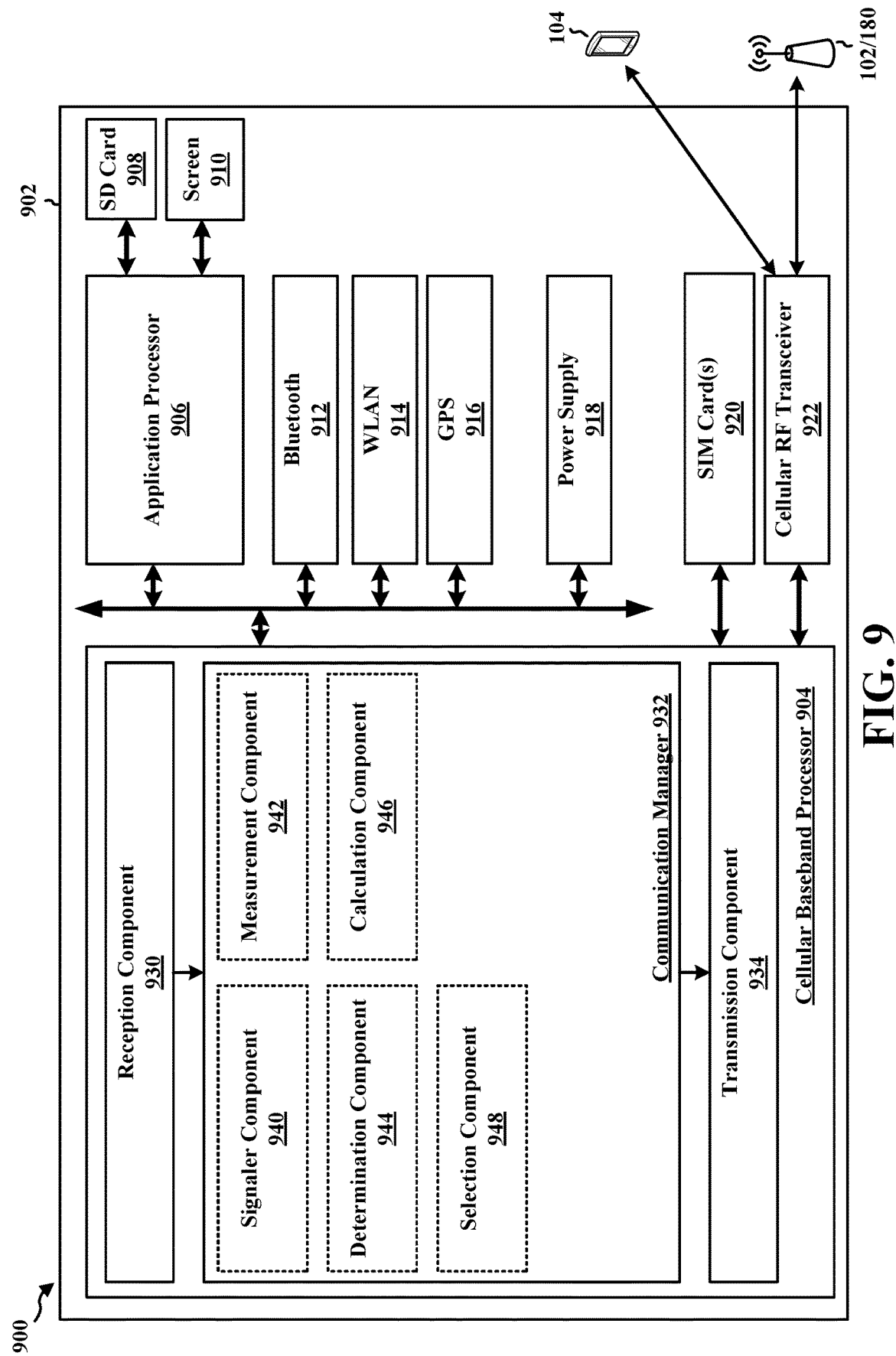
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The reception component 934 is configured, e.g., as described in connection with 704 and 802, to receive, from a second node, during a LBT procedure of a first node, at least one signal that includes a signal energy–the LBT procedure is associated with a total measured interference from all detected energy sources.

The communication manager 932 includes a signaler component 940 that is configured, e.g., as described in connection with 702, to signal, to a second node, a capability of a node to determine interference from at least one other source based on a calculation of a difference between a total measured interference from all detected energy sources and interference determined based on signal energy of at least one signal. The communication manager 932 further includes a measurement component 942 that is configured, e.g., as described in connection with 706, to measure, based on the LBT procedure, the total measured interference from all detected energy sources. The communication manager 932 further includes a determination component 944 that is configured, e.g., as described in connection with 708, 712, and 804, to determine the self-interference at the second entity of the node based on the signal energy of the at least one signal transmitted via the first entity of the node; to determine whether a channel is idle based on a comparison of the interference from the at least one other source to a channel idleness energy threshold; and to determine an interference at the first node based on the signal energy of the at least one signal transmitted from the second node. The communication manager 932 further includes a calculation component 946 that is configured, e.g., as described in connection with 710 and 806, to calculate the interference from the at least one other source based on the difference between the total measured interference from all detected energy sources and the self-interference determined based on the signal energy of the at least one signal; and to calculate additional interference from at least one other source based on a difference between the total measured interference from all detected energy sources and the interference determined based on the signal energy of the at least one signal. The communication manager 932 further includes a selection component 948 that is configured, e.g., as described in connection with 714, to select at least one of a first beam for the first entity of the node or a second beam for the second entity of the node that reduces the self-interference at the second entity of the node.

The transmission component 934 is configured, e.g., as described in connection with 704 and 716, to transmit, via a first entity of the node, during a LBT procedure of a second entity of the node, the at least one signal that includes the signal energy–the LBT procedure is associated with the total measured interference from all detected energy sources; and to transmit one or more signals based on the calculation of the interference from the at least one other source.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for transmitting, via a first entity of the node, at least one signal during a LBT procedure of a second entity of the node, the at least one signal including a signal energy, the LBT procedure associated with a total measured interference from all detected energy sources; means for determining a self-interference at the second entity of the node based on the signal energy of the at least one signal transmitted via the first entity of the node; and means for calculating an interference from at least one other source based on a difference between the total measured interference from all detected energy sources and the self-interference determined based on the signal energy of the at least one signal. The apparatus 902 further includes means for determining whether a channel is idle based on a comparison of the interference from the at least one other source to a channel idleness energy threshold. The apparatus 902 further includes means for measuring, based on the LBT procedure, the total measured interference from all detected energy sources. The apparatus 902 further includes means for selecting at least one of a first beam for the first entity of the node or a second beam for the second entity of the node that reduces the self-interference at the second entity of the node. The apparatus 902 further includes means for signaling, to a second node, a capability of the node to determine the interference from the at least one other source based on the calculation of the difference between the total measured interference from all detected energy sources and the self-interference determined based on the signal energy of the at least one signal. The apparatus 902 further includes means for transmitting one or more signals based on the calculation of the interference from the at least one other source. The apparatus 902 further includes means for receiving, from a second node, at least one signal during a LBT procedure of the first node, the at least one signal including a signal energy, the LBT procedure associated with a total measured interference from all detected energy sources; means for determining an interference at the first node based on the signal energy of the at least one signal transmitted from the second node; and means for calculating additional interference from at least one other source based on a difference between the total measured interference from all detected energy sources and the interference determined based on the signal energy of the at least one signal.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
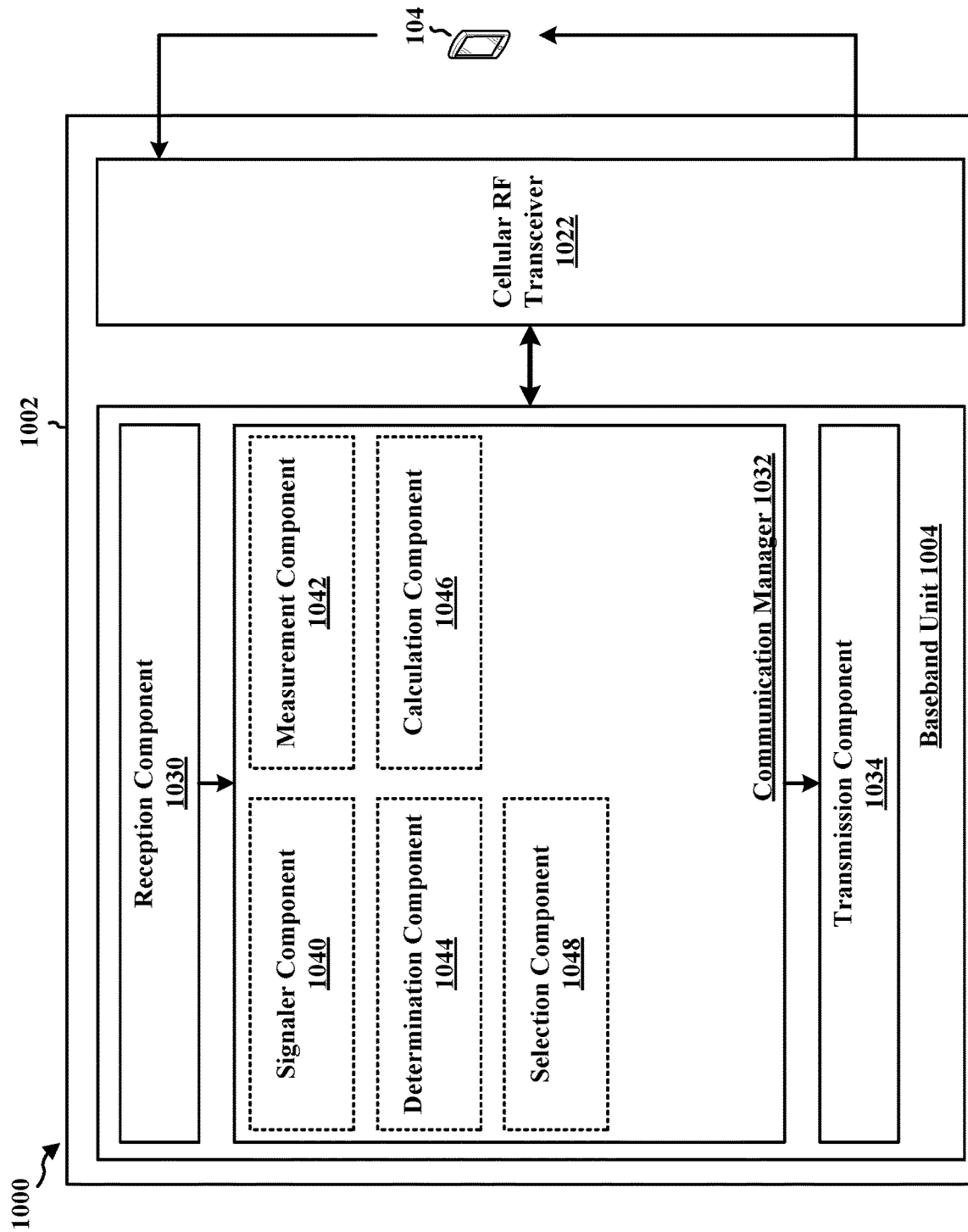
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The reception component 1034 is configured, e.g., as described in connection with 704 and 802, to receive, from a second node, during a LBT procedure of a first node, at least one signal that includes a signal energy–the LBT procedure is associated with a total measured interference from all detected energy sources.

The communication manager 1032 includes a signaler component 1040 that is configured, e.g., as described in connection with 702, to signal, to a second node, a capability of a node to determine interference from at least one other source based on a calculation of a difference between a total measured interference from all detected energy sources and interference determined based on signal energy of at least one signal. The communication manager 1032 further includes a measurement component 1042 that is configured, e.g., as described in connection with 706, to measure, based on the LBT procedure, the total measured interference from all detected energy sources. The communication manager 1032 further includes a determination component 1044 that is configured, e.g., as described in connection with 708, 712, and 804, to determine the self-interference at the second entity of the node based on the signal energy of the at least one signal transmitted via the first entity of the node; to determine whether a channel is idle based on a comparison of the interference from the at least one other source to a channel idleness energy threshold; and to determine an interference at the first node based on the signal energy of the at least one signal transmitted from the second node. The communication manager 1032 further includes a calculation component 1046 that is configured, e.g., as described in connection with 710 and 806, to calculate the interference from the at least one other source based on the difference between the total measured interference from all detected energy sources and the self-interference determined based on the signal energy of the at least one signal; and to calculate additional interference from at least one other source based on a difference between the total measured interference from all detected energy sources and the interference determined based on the signal energy of the at least one signal. The communication manager 1032 further includes a selection component 1048 that is configured, e.g., as described in connection with 714, to select at least one of a first beam for the first entity of the node or a second beam for the second entity of the node that reduces the self-interference at the second entity of the node.

The transmission component 1034 is configured, e.g., as described in connection with 704 and 716, to transmit, via a first entity of the node, during a LBT procedure of a second entity of the node, the at least one signal that includes the signal energy–the LBT procedure is associated with the total measured interference from all detected energy sources; and to transmit one or more signals based on the calculation of the interference from the at least one other source.

The apparatus may include additional components that perform each of the blocks of the algorithm in the aforementioned flowcharts of FIGS. 7-8. As such, each block in the aforementioned flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting, via a first entity of the node, at least one signal during a LBT procedure of a second entity of the node, the at least one signal including a signal energy, the LBT procedure associated with a total measured interference from all detected energy sources; means for determining a self-interference at the second entity of the node based on the signal energy of the at least one signal transmitted via the first entity of the node; and means for calculating an interference from at least one other source based on a difference between the total measured interference from all detected energy sources and the self-interference determined based on the signal energy of the at least one signal. The apparatus 1002 further includes means for determining whether a channel is idle based on a comparison of the interference from the at least one other source to a channel idleness energy threshold. The apparatus 1002 further includes means for measuring, based on the LBT procedure, the total measured interference from all detected energy sources. The apparatus 1002 further includes means for selecting at least one of a first beam for the first entity of the node or a second beam for the second entity of the node that reduces the self-interference at the second entity of the node. The apparatus 1002 further includes means for signaling, to a second node, a capability of the node to determine the interference from the at least one other source based on the calculation of the difference between the total measured interference from all detected energy sources and the self-interference determined based on the signal energy of the at least one signal. The apparatus 1002 further includes means for transmitting one or more signals based on the calculation of the interference from the at least one other source. The apparatus 1002 further includes means for receiving, from a second node, at least one signal during a LBT procedure of the first node, the at least one signal including a signal energy, the LBT procedure associated with a total measured interference from all detected energy sources; means for determining an interference at the first node based on the signal energy of the at least one signal transmitted from the second node; and means for calculating additional interference from at least one other source based on a difference between the total measured interference from all detected energy sources and the interference determined based on the signal energy of the at least one signal.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a node, including: transmitting, via a first entity of the node, at least one signal during a LBT procedure of a second entity of the node, the at least one signal including a signal energy, the LBT procedure associated with a total measured interference from all detected energy sources; determining a self-interference at the second entity of the node based on the signal energy of the at least one signal transmitted via the first entity of the node; and calculating an interference from at least one other source based on a difference between the total measured interference from all detected energy sources and the self-interference determined based on the signal energy of the at least one signal.

Aspect 2 may be combined with aspect 1 and further includes determining whether a channel is idle based on a comparison of the interference from the at least one other source to a channel idleness energy threshold.

Aspect 3 may be combined with any of aspects 1-2 and includes that the self-interference at the second entity of the node is further determined based on a channel measurement between the first entity of the node and the second entity of the node, the channel measurement performed prior to the LBT procedure based on a predetermined signal.

Aspect 4 may be combined with any of aspects 1-3 and includes that the self-interference at the second entity of the node is determined prior to transmission of the at least one signal based on an indication of the at least one signal.

Aspect 5 may be combined with any of aspects 1-3 and includes that the self-interference at the second entity of the node is determined during transmission of the at least one signal.

Aspect 6 may be combined with any of aspects 1-3 or 5 and includes that the at least one signal is a reference signal including at least one of a SSB, a CSI-RS, a SRS, or a DMRS.

Aspect 7 may be combined with any of aspects 1-6 and further includes measuring, based on the LBT procedure, the total measured interference from all detected energy sources.

Aspect 8 may be combined with any of aspects 1-7 and further includes selecting at least one of a first beam for the first entity of the node or a second beam for the second entity of the node that reduces the self-interference at the second entity of the node.

Aspect 9 may be combined with any of aspects 1-8 and includes that the calculation of the interference from the at least one other source is further based on equating the interference from the at least one other source to the total measured interference from all detected energy sources.

Aspect 10 may be combined with any of aspects 1-9 and further includes signaling, to a second node, a capability of the node to determine the interference from the at least one other source based on the calculation of the difference between the total measured interference from all detected energy sources and the self-interference determined based on the signal energy of the at least one signal.

Aspect 11 may be combined with any of aspects 1-10 and includes that the capability of the node is configured to be enabled or disabled.

Aspect 12 may be combined with any of aspects 1-11 and includes that an energy detection threshold is configured based on the capability of the node to determine the interference from the at least one other source based on the calculation of the difference between the total measured interference from all detected energy sources and the self-interference determined based on the signal energy of the at least one signal.

Aspect 13 may be combined with any of aspects 1-12 and further includes transmitting one or more signals based on the calculation of the interference from the at least one other source.

Aspect 14 may be combined with any of aspects 1-13 and includes that the node is an IAB node, a UE, or a base station.

Aspect 15 is a method of wireless communication at a first node, including: receiving, from a second node, at least one signal during a LBT procedure of the first node, the at least one signal including a signal energy, the LBT procedure associated with a total measured interference from all detected energy sources; determining an interference at the first node based on the signal energy of the at least one signal transmitted from the second node; and calculating additional interference from at least one other source based on a difference between the total measured interference from all detected energy sources and the interference determined based on the signal energy of the at least one signal.

Aspect 16 is an apparatus for wireless communication including at least one processor coupled to a memory and configured to implement a method as in any of aspects 1-15.

Aspect 17 is an apparatus for wireless communication including means for implementing a method as in any of aspects 1-15.

Aspect 18 is a computer-readable medium storing computer executable code, the code when executed by at least one processor causes the at least one processor to implement a method as in any of aspects 1-15.

What is claimed is:

1. An apparatus for wireless communication at a node, comprising:
    memory; and
    one or more processors coupled to the memory, wherein the one or more processors are and configured to:
        transmit, via a first entity of the node, at least one signal during a listen before talk (LBT) procedure of a second entity of the node, wherein the at least one signal includes a signal energy, wherein the at least one signal is included in a transmission that does not include a transmission gap, wherein the LBT procedure is associated with a total measured interference from all detected energy sources, and wherein the LBT procedure is associated with a sensing slot that includes a measurement window;
        determine, during the transmission and via the second entity of the node, a self-interference at the second entity of the node based on the signal energy of the at least one signal transmitted via the first entity of the node; and
        calculate, within the sensing slot and after the measurement window and via the second entity of the node, an interference from at least one other source based on a difference between the total measured interference from all detected energy sources and the self-interference determined based on the signal energy of the at least one signal.

2. The apparatus of claim 1, wherein the one or more processors are further configured to determine whether a channel is idle based on a comparison of the interference from the at least one other source to a channel idleness energy threshold.

3. The apparatus of claim 1, wherein, to determine the self-interference at the second entity of the node, the one or more processors are configured to determine the self-interference at the second entity of the node further based on a channel measurement between the first entity of the node and the second entity of the node, wherein performance of the channel measurement is prior to the LBT procedure and based on a predetermined signal.

4. The apparatus of claim 1, wherein, to determine the self-interference at the second entity of the node, the one or more processors are configured to determine the self-interference at the second entity of the node prior to the transmission of the at least one signal based on an indication of the at least one signal.

5. The apparatus of claim 1, wherein, to determine the self-interference at the second entity of the node, the one or more processors are configured to determine the self-interference at the second entity of the node during the transmission of the at least one signal.

6. The apparatus of claim 5, wherein the at least one signal is a reference signal including at least one of a synchronization signal block (SSB), a channel state information-reference signal (CSI-RS), a sounding reference signal (SRS), or a demodulation reference signal (DMRS).

7. The apparatus of claim 1, wherein the one or more processors are further configured to measure, based on the LBT procedure, the total measured interference from all detected energy sources.

8. The apparatus of claim 1, wherein the one or more processors are further configured to select at least one of a first beam for the first entity of the node or a second beam for the second entity of the node that reduces the self-interference at the second entity of the node.

9. The apparatus of claim 8, wherein, to calculate the interference from the at least one other source, the one or more processors are configured to calculate the interference from the at least one other source further based on the interference from the at least one other source being equal to the total measured interference from all detected energy sources.

10. The apparatus of claim 1, wherein the one or more processors are further configured to signal, to a second node, a capability of the node to calculate the interference from the at least one other source based on the difference between the total measured interference from all detected energy sources and the self-interference based on the signal energy of the at least one signal.

11. The apparatus of claim 10, wherein the capability of the node is configured to be enabled or disabled.

12. The apparatus of claim 10, wherein an energy detection threshold is configured based on the capability of the node to calculate the interference from the at least one other source based on the difference between the total measured interference from all detected energy sources and the self-interference based on the signal energy of the at least one signal.

13. The apparatus of claim 1, wherein the one or more processors are further configured to transmit one or more signals based on the calculation of the interference from the at least one other source.

14. The apparatus of claim 1, wherein the node is an integrated access and backhaul (IAB) node, a user equipment (UE), or a base station.

15. An apparatus for wireless communication at a first node, comprising:
  memory; and
  one or more processors coupled to the memory, wherein the one or more processors are configured to:
    receive, from a second node, at least one signal during a listen before talk (LBT) procedure of the first node, wherein the at least one signal includes a signal energy, wherein the at least one signal is included in a transmission that does not include a transmission gap, wherein the LBT procedure is associated with a total measured interference from all detected energy sources, and wherein the LBT procedure is associated with a sensing slot that includes a measurement window;
    determine, during the transmission, an interference at the first node based on the signal energy of the at least one signal transmitted from the second node; and
    calculate, within the sensing slot and after the measurement window, additional interference from at least one other source based on a difference between the total measured interference from all detected energy sources and the interference determined based on the signal energy of the at least one signal.

16. A method of wireless communication at a node, comprising:
  transmitting, via a first entity of the node, at least one signal during a listen before talk (LBT) procedure of a second entity of the node, wherein the at least one signal includes a signal energy, wherein the at least one signal is included in a transmission that does not include a transmission gap, wherein the LBT procedure is associated with a total measured interference from all detected energy sources, and wherein the LBT procedure is associated with a sensing slot that includes a measurement window;
  determining, during the transmission and via the second entity of the node, a self-interference at the second entity of the node based on the signal energy of the at least one signal transmitted via the first entity of the node; and
  calculating, within the sensing slot and after the measurement window and via the second entity of the node, an interference from at least one other source based on a difference between the total measured interference from all detected energy sources and the self-interference determined based on the signal energy of the at least one signal.

17. The method of claim 16, further comprising determining whether a channel is idle based on a comparison of the interference from the at least one other source to a channel idleness energy threshold.

18. The method of claim 16, wherein the self-interference at the second entity of the node is further determined based on a channel measurement between the first entity of the node and the second entity of the node, the channel measurement performed prior to the LBT procedure based on a predetermined signal.

19. The method of claim 16, wherein the self-interference at the second entity of the node is determined prior to the transmission of the at least one signal based on an indication of the at least one signal.

20. The method of claim 16, wherein the self-interference at the second entity of the node is determined during the transmission of the at least one signal.

21. The method of claim 20, wherein the at least one signal is a reference signal including at least one of a synchronization signal block (SSB), a channel state information-reference signal (CSI-RS), a sounding reference signal (SRS), or a demodulation reference signal (DMRS).

22. The method of claim 16, further comprising measuring, based on the LBT procedure, the total measured interference from all detected energy sources.

23. The method of claim 16, further comprising selecting at least one of a first beam for the first entity of the node or a second beam for the second entity of the node that reduces the self-interference at the second entity of the node.

24. The method of claim 23, wherein the calculation of the interference from the at least one other source is further based on equating the interference from the at least one other source to the total measured interference from all detected energy sources.

25. The method of claim 16, further comprising signaling, to a second node, a capability of the node to calculate the interference from the at least one other source based on the difference between the total measured interference from all detected energy sources and the self-interference determined based on the signal energy of the at least one signal.

26. The method of claim 25, wherein the capability of the node is configured to be enabled or disabled.

27. The method of claim 25, wherein an energy detection threshold is configured based on the capability of the node to calculate the interference from the at least one other source based on the difference between the total measured interference from all detected energy sources and the self-interference determined based on the signal energy of the at least one signal.

28. The method of claim 16, further comprising transmitting one or more signals based on the calculation of the interference from the at least one other source.

29. The method of claim 16, wherein the node is an integrated access and backhaul (IAB) node, a user equipment (UE), or a base station.

30. A method of wireless communication at a first node, comprising:
  receiving, from a second node, at least one signal during a listen before talk (LBT) procedure of the first node, wherein the at least one signal including a signal energy, wherein the at least one signal is included in a transmission that does not include a transmission gap, wherein the LBT procedure is associated with a total measured interference from all detected energy sources, and wherein the LBT procedure is associated with a sensing slot that includes a measurement window;
  determining, during the transmission, an interference at the first node based on the signal energy of the at least one signal transmitted from the second node; and
  calculating, within the sensing slot and after the measurement window, additional interference from at least one other source based on a difference between the total measured interference from all detected energy sources and the interference determined based on the signal energy of the at least one signal.

31. The apparatus of claim 1, wherein the node comprises one of a user equipment (UE) or a base station, and wherein the first entity and the second entity comprise one of:
  a first spatial beam direction and a second spatial beam direction, respectively,
  a first frequency domain channel and a second frequency domain channel, respectively, a first transmit reception point (TRP) and a second TRP, respectively, or a first antenna panel and a second antenna panel, respectively.

32. The apparatus of claim 1, wherein the node comprises an integrated access and backhaul (IAB) node, wherein the first entity comprises a mobile termination (MT) function, and wherein the second entity comprises a distributed unit (DU) function.

* * * * *